(12) United States Patent
Miyazaki

(10) Patent No.: US 7,737,209 B2
(45) Date of Patent: Jun. 15, 2010

(54) RUBBER COMPOSITION AND TIRE USING SAME

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 303 days.

(21) Appl. No.: 11/808,726

(22) Filed: Jun. 12, 2007

(65) Prior Publication Data

US 2008/0009570 A1    Jan. 10, 2008

(30) Foreign Application Priority Data

Jul. 6, 2006    (JP) .............................. 2006-186351

(51) Int. Cl.
    *C08F 283/08*    (2006.01)
    *C07D 209/76*    (2006.01)
(52) U.S. Cl. ........................................ 524/508; 524/89
(58) Field of Classification Search .................. 524/508
    See application file for complete search history.

(56) References Cited

U.S. PATENT DOCUMENTS

| | | | |
|---|---|---|---|
| 4,908,401 A | | 3/1990 | Ohara et al. |
| 4,914,147 A | | 4/1990 | Mouri et al. |
| 5,026,762 A | * | 6/1991 | Kida et al. ................... 524/495 |
| 5,174,838 A | * | 12/1992 | Sandstrom et al. ....... 152/209.5 |
| 6,310,144 B1 | | 10/2001 | Inui et al. |
| 7,268,187 B2 | * | 9/2007 | Miyazaki .................... 525/236 |
| 7,432,337 B2 | * | 10/2008 | Miyazaki .................... 526/335 |
| 2003/0060551 A1 | * | 3/2003 | Mizuno et al. .............. 524/418 |
| 2006/0266459 A1 | | 11/2006 | Miyazaki | |

FOREIGN PATENT DOCUMENTS

| | | | |
|---|---|---|---|
| CN | 1093724 A | | 10/1994 |
| EA | 1 439 204 A2 | | 7/2004 |
| EP | 1 568 735 A1 | | 8/2005 |
| EP | 1 577 339 A1 | | 9/2005 |
| EP | 1 726 615 A1 | | 11/2006 |
| JP | 11-209518 A | | 8/1999 |
| JP | 11-263102 A | | 9/1999 |
| JP | 2002-327158 A | | 11/2002 |
| JP | 2002-338738 A | | 11/2002 |
| JP | 2004-217817 A | | 8/2004 |
| JP | 2004-231922 A | | 8/2004 |
| JP | 2006-328194 A | | 12/2006 |
| WO | WO0053671 | * | 9/2000 |

OTHER PUBLICATIONS

Zhao Xusheng et al., "The Application of Modified Synthetic Rubber in Tire Industry", Guangzhou Chemistry, Jun. 2001, pp. 55-60, vol. 26, No. 2, 1009-220X(2001)02-0055-06.

* cited by examiner

*Primary Examiner*—Ling-Siu Choi
*Assistant Examiner*—Hui Chin
(74) *Attorney, Agent, or Firm*—Birch, Stewart, Kolasch & Birch, LLP

(57) ABSTRACT

The present invention provides a rubber composition with superior properties with respect to processability, low fuel consumption, complex modulus, and durability, and tires prepared by using the rubber composition. The rubber composition of the present invention comprises: 2 to 2.9 parts by weight of (B) sulfur, 0.6 to 10 parts by weight of (C) at least one compound selected from the group consisting of a cresol resin, a resorcin condensate, and a modified resorcin condensate, and 10 to 55 parts by weight of (D) a carbon black and/or silica, based on 100 parts by weight of (A) a rubber component comprising a natural rubber and/or isoprene rubber and at least two kinds of synthetic rubbers selected from the group consisting of butadiene rubber, modified butadiene rubber, styrene-butadiene rubber, and modified styrene-butadiene rubber. The tire of the present invention is prepared by using the rubber composition.

11 Claims, No Drawings

RUBBER COMPOSITION AND TIRE USING SAME

BACKGROUND OF THE INVENTION

The present invention relates to a rubber composition and a tire using the same.

In recent years, tires have been required to exhibit better steering stability and ride qualities, for example, a dependable braking performance while running at a high speed.

With respect to technologies to improve steering stability of tires formed from fiber cords coated with a rubber composition, a method to improve complex modulus (E*) of the rubber composition and thus rigidity of the tires is known in the prior art. More specifically, a method of compounding a phenol resin in the rubber composition is known. However, there is a problem that a rolling resistance (tan δ) of the rubber composition thus obtained is increased.

For improving complex modulus (E*) and decreasing rolling resistance (tan δ), a method of crosslinking a resorcin condensate or a modified resorcin condensate using a partial condensate of hexamethylolmelaminepentamethyl ether (HMMPME) or a partial condensate of hexamethoxymethylolmelamine (HMMM) is well known. However, in such a case, during processing of the rubber composition into sheets or toppings, crosslinking starts, resulting in increase of a viscosity of the rubber composition and making its processability unsatisfactory.

Also, for improving complex modulus (E*) and decreasing rolling resistance (tan δ), an another method of blending a large quantity of sulfur or a vulcanization accelerator is known. However, the rubber composition thus prepared provides tires with unfavorable durability because of marked natural hardening during running.

Furthermore, in response to consumers' demands for tires assuring low fuel consumption, technologies for reducing fuel consumption have been actively developed in recent years by means of improvement on a tread or a sidewall.

As a result of progress in improvement for low fuel consumption associated with improvement of such large size elements as the tread and sidewalls, cord topping rubber becomes more important for further advancement of reduction of fuel consumption.

Although FEM analyses show that reduction in rolling resistance (tan δ) is effective in making the cord topping rubber contribute to low fuel consumption, no effective technologies to lower the rolling resistance (tan b) have been developed yet.

In reducing rolling resistance (tan δ), for example, a method of decreasing the content of carbon black or, on the contrary, a method of increasing the content of oil is known. However, when the content of carbon black is reduced, the rubber composition thus prepared has deteriorated breaking properties. When the content of oil is increased, in addition to deterioration in the breaking properties, durability of the rubber composition is also deteriorated due to migration of oil to such adjacent elements as sidewalls, an inner liner and cushion rubber.

JP2004-217817A discloses a rubber composition which comprises a compound capable of donating methylene groups and a resorcin resin, and are suitable for use at breaker edges. However, since the rubber composition comprises only a natural rubber and/or isoprene rubber as the rubber component and has a large content of sulfur (4 to 6 parts by weight), deterioration in physical properties is caused by reversion during vulcanization under high temperature. Therefore, improvements are still required.

An object of the present invention is to provide a rubber composition with an adequate level of hardness, and excellent processability, rolling workability, low fuel consumption, elongation at break, complex modulus, and durability, and another object of the present invention is to provide a tire using the rubber composition.

SUMMARY OF THE INVENTION

The present invention relates to a rubber composition comprising 2 to 2.9 parts by weight of (B) sulfur, 0.6 to 10 parts by weight of (C) at least one compound selected from the group consisting of a cresol resin, a resorcin condensate, and a modified resorcin condensate, and 10 to 55 parts by weight of (D) a carbon black and/or silica, based on 100 parts by weight of (A) a rubber component comprising a natural rubber and/or isoprene rubber and at least two kinds of synthetic rubbers selected from the group consisting of butadiene rubber, modified butadiene rubber, styrene-butadiene rubber, and modified styrene-butadiene rubber.

It is preferable that the rubber composition further comprises 0.1 to 3 parts by weight of (E) hexamethylenetetramine, based on 100 parts by weight of (A) the rubber component.

It is preferable that the rubber composition further comprises 0.5 to 3 parts by weight of (F) a partial condensate of hexamethylolmelaminepentamethyl ether or a partial condensate of hexamethoxymethylolmelamine, based on 100 parts by weight of (A) the rubber component.

It is preferable that the rubber composition comprises a modified butadiene rubber or a modified styrene-butadiene rubber as a synthetic rubber.

It is preferable that the rubber composition comprises a modified butadiene rubber and a modified styrene-butadiene rubber as a synthetic rubber.

It is preferable that the rubber component (A) comprises 40 to 80% by weight of a natural rubber and/or isoprene rubber and 10 to 30% by weight of a modified butadiene rubber.

It is preferable that the rubber composition of the present invention is coated on fiber cords, and the coated fiber cords are used to form carcasses or belts.

The present invention also relates to a tire using the aforementioned rubber composition.

According to the present invention, a rubber composition comprising specified amounts of a specific rubber component (A), sulfur (B), at least one compound (C) selected from the group consisting of a cresol resin, a resorcin condensate, and a modified resorcin condensate, and a carbon black and/or silica (D) is provided, the rubber composition having an adequate level of hardness, and excellent processability, rolling workability, low fuel consumption, elongation at break, complex modulus, and durability. The present invention can also provide a tire using the aforementioned rubber composition.

DETAILED DESCRIPTION

The rubber composition of the present invention comprises (A) a rubber component, (B) sulfur, (C) at least one compound selected from the group consisting of a cresol resin, a resorcin condensate, and a modified resorcin condensate, and (D) a carbon black and/or silica.

The rubber component (A) comprises a natural rubber (NR) and/or isoprene rubber (IR), and at least two kinds of synthetic rubbers selected from the group consisting of butadiene rubber (BR), modified butadiene rubber (modified BR), styrene-butadiene rubber (SBR), and modified styrene-butadiene rubber (modified SBR).

NR is not particularly limited and such grades commonly utilized in the rubber industry as RSS#3 and TSR20 can be used. Similarly, IR is not particularly limited and any grades which have been utilized in the tire manufacturing industry can be employed.

A content of NR and/or IR in the rubber component (A) is preferably not less than 40% by weight, more preferably not less than 50% by weight. In the case where the content of NR and/or IR is less than 40% by weight, the rubber composition exhibits smaller elongation at break in a tensile test and there is a tendency that tires prepared by using the rubber composition break easily when the tires run on a bumpy road or hit an obstacle. Also, the content of NR and/or IR in the rubber component (A) is preferably not more than 90% by weight, more preferably not more than 80% by weight, further preferably not more than 75% by weight. In the case where the content of NR and/or IR exceeds 90% by weight, the rubber composition tends to exhibit deteriorated properties in, for example, breaking resistance and elongation at break due to reversion during vulcanization under high temperature and weakening of a polymeric structure caused, for example, by partial transformation from a 100% cis-structure into a trans-structure.

BR is not particularly limited and BR with a high-cis content (high-cis BR) such as BR130B and BR150B available from Ube Industries, Ltd. are suitable for the rubber composition of the present invention. A content of BR in the rubber component (A) is preferably not less than 10% by weight, more preferably not less than 15% by weight from the viewpoint of excellent crack growth resistance. Because a favorable effect on elongation at break is obtained and the effect of improvement in crack growth resistance induced by blending of BR saturates at a certain level, the content of BR in the rubber component (A) is preferably not more than 50% by weight, more preferably not more than 40% by weight.

Modified BR is obtained by adding tin compounds to a product produced through polymerization of 1,3-butadiene using a lithium initiator. It is preferable that modified BR has tin-carbon bonds at the terminals of the modified BR molecules.

Examples of the lithium initiator are lithium base compounds such as alkyl lithium, aryl lithium, vinyl lithium, organotin lithium, and organic nitrogen lithium compounds, as well as lithium metal. By using one of the lithium initiators as an initiator, modified BR with a high vinyl content but a low content of cis-structure can be prepared.

Examples of tin compounds are tin tetrachloride, butyltin trichloride, dibutyltin dichloride, dioctyltin dichloride, tributyltin chloride, triphenyltin chloride, diphenyl-dibutyltin, triphenyltin ethoxide, diphenyl-dimethyltin, ditolyltin chloride, diphenyltin dioctanoate, divinyl-diethyltin, tetrabenzyltin, dibutyltin distearate, tetraaryltin, and p-tributyltin styrene. These tin compounds may be used alone and two or more kinds thereof may be used in combination.

A content of tin atoms in the modified BR is preferably not less than 50 ppm, more preferably not less than 60 ppm. In the case where the content of tin atoms is less than 50 ppm, the rubber composition tends to exhibit larger rolling resistance (tan δ) since the effect of the tin atoms to accelerate dispersion of carbon black in modified BR becomes inadequate. At the same time, the content of tin atoms is preferably 3,000 ppm, more preferably not more than 2,500 ppm, further preferably not more than 250 ppm. In the case where the content of tin atoms exceeds 3,000 ppm, unity of the kneaded product is weakened and edge becomes uneven, and thus the rubber compound tends to have deteriorated extrusion processability.

Molecular weight distribution (Mw/Mn) of the modified BR is preferably not more than 2, more preferably not more than 1.5. In the case where Mw/Mn of the modified BR exceeds 2, dispersion of carbon black deteriorates and the rubber composition tends to exhibit larger rolling resistance (tan δ).

The amount of bonded vinyls in the modified BR is preferably not less than 5% by weight, more preferably not less than 7% by weight. In the case where the amount of bonded vinyls is less than 5% by weight, polymerization (production) of modified BR tends to be difficult. At the same time, the amount of bonded vinyls in the modified BR is preferably not more than 50% by weight, more preferably not more than 20% by weight. In the case where the amount of bonded vinyls exceeds 50% by weight, dispersion of carbon black deteriorates and the rubber composition tends to exhibit smaller tensile strength.

The content of modified BR in the rubber component (A) is preferably not less than 10% by weight, more preferably not less than 15% by weight. In the case where the content of modified BR is less than 10% by weight, crack growth resistance tends to be inadequate. At the same time, the content of modified BR in the rubber component (A) is preferably not more than 50% by weight, more preferably not more than 40% by weight, further preferably not more than 30% by weight. In the case where the content of modified BR exceeds 50% by weight, crack growth resistance is saturated and is not improved even if the content of modified BR is raised, and the rubber composition tends to exhibit smaller elongation at break.

An example of modified BR satisfying the above requirements is, for example, BR1250H available from ZEON Corporation.

SBR is not particularly limited, and emulsion polymerization SBR (E-SBR) or solution polymerization SBR (S-SBR) may be used.

The content of SBR in the rubber component (A) is preferably not less than 10% by weight, more preferably not less than 15% by weight. In the case where the content of SBR is less than 10% by weight, the effect to inhibit reversion tends to be inadequate. At the same time, the content of SBR in the rubber component (A) is preferably not more than 50% by weight, more preferably not more than 40% by weight. In the case where the content of SBR exceeds 50% by weight, the rubber composition tends to exhibit smaller tensile strength at break.

For modified SBR, modified SBR having a small amount of bonded styrenes such as HPR340 available from JSR Corporation is preferable.

From the viewpoint of excellent property of inhibiting reversion, an amount of bonded styrenes is preferably not less than 5% by weight, more preferably not less than 7% by weight. At the same time, because of a favorable effect on a low heat build-up property, an amount of bonded styrenes is preferably not more than 30% by weight, more preferably not more than 20% by weight.

Examples of modified SBR are modified emulsion polymerization SBR (modified E-SBR) and modified solution polymerization SBR (modified S-SBR), and a modified S-SBR is preferable because low fuel consumption can be enhanced by strengthening bonding of silica to polymer chains and reducing rolling resistance (tan δ).

For modified SBR, it is preferable to use those coupled with tin or silica. Examples of known coupling methods of modified SBR are, for example, a method of reacting halogenated tin or halogenated silica with alkaline metal (e.g., lithium) or alkaline earth metal (e.g., magnesium) at the ends of molecular chains of modified SBR.

Modified SBR is a (co)polymer prepared by (co)polymerizing conjugated diolefin alone or (co)polymerizing conjugated diolefin and aromatic vinyl compounds. Modified SBR preferably has a primary amino group or an alkoxysilyl group.

The primary amino group may be coupled to any of a polymerization initiation end, a polymerization termination end, a main chain of polymers, or a side chain of polymers. It is preferable that the primary amino group is introduced into either the polymerization initiation end or the polymerization termination end because a hysteresis loss can be improved by reducing energy loss from the ends of polymers.

To secure adequate breaking properties, a weight-average molecular weight (Mw) of the modified SBR is preferably not less than 1.0 million, more preferably not less than 1.2 million. At the same time, a weight-average molecular weight (Mw) of modified SBR is preferably not more than 2.0 million, more preferably not more than 1.8 million because it is possible to adjust a viscosity of the rubber and make a kneading process easy.

The content of modified SBR in the rubber component (A) is preferably not less than 10% by weight, more preferably not less than 15% by weight. In the case where the content of modified SBR is less than 10% by weight, there is a tendency that a property of inhibiting reversion and rolling resistance (tan δ) is deteriorated. At the same time, the content of modified SBR in the rubber component (A) is preferably not more than 40% by weight, more preferably not more than 35% by weight. In the case where the content of modified SBR exceeds 40% by weight, tensile strength at break tends to deteriorate.

The synthetic rubber is selected from the group consisting of BR, modified BR, SBR, and modified SBR. When SBR is used, occurrence of reversion is restricted and sufficient hardness can be maintained. When BR is used, superior crack growth resistance is obtained. Similarly, modified BR has a property of playing good interactions with carbon black and may strengthen bonding of carbon black to polymer chains, and modified SBR has a property of playing good interactions with silica and may strengthen bonding of silica to polymer chains. The rubber component (A) of the present invention comprises at least two kinds of synthetic rubbers selected from the group consisting of BR, modified BR, SBR, and modified SBR. As there is a case that excellent low fuel consumption or improvement in tensile strength at break can be obtained when carbon black and silica are compounded, it is preferable for the rubber component to comprise either modified BR or modified SBR, more preferably both of modified BR and modified SBR.

Besides the aforementioned NR, IR, BR, modified BR, SBR, and modified SBR, the rubber component (A) may comprise other kinds of rubbers conventionally used in the tire manufacturing industry such as acrylonitrile-butadiene rubber (NBR), chloroprene rubber (CR), ethylene-propylene-diene rubber (EPDM), and styrene-isoprene-butadiene rubber (SIBR).

In order to maintain crack growth resistance and processability and to give excellent anti-degradation property, a content of these kinds of rubbers in the rubber component (A) is preferably not more than 20% by weight, more preferably not more than 15% by weight. It is possible that these kinds of rubbers are not contained in the rubber composition of the present invention.

Sulfur (B) can be any kinds of sulfur conventionally used for vulcanization in the rubber industry and it is particularly preferable to use insoluble sulfur. Hereat, insoluble sulfur represents sulfur with a high molecular weight of $S_x$ (x=0.1 to 0.3 million), prepared by heating and rapidly cooling natural sulfur $S_8$. Insoluble sulfur can avoid blooming, which is commonly observed when used as a vulcanizing agent.

A content of sulfur (B) is not less than 2 parts by weight, preferably not less than 2.4 parts by weight based on 100 parts by weight of the rubber component (A). In the case where the content of sulfur (B) is less than 2 parts by weight, the rubber compositions have low adhesiveness due to lack of adequate supply of sulfur to adhesion layers of the fiber cords forming carcasses. At the same time, the content of sulfur (B) is not more than 2.9 parts by weight, preferably not more than 2.8 parts by weight, based on 100 parts by weight of the rubber component (A). In the case where the content of sulfur exceeds 2.9 parts by weight, sulfur-crosslinking density becomes excessive and there is caused deterioration in such breaking properties as resistance to breaking and elongation at break, in particular breaking properties after deterioration due to thermal oxidation.

The rubber composition of the present invention comprises at least one compound (C) selected from the group consisting of a cresol resin, a resorcin condensate, and a modified resorcin condensate (referred to as compound (C) hereinafter).

As for the cresol resin, it is most preferable to use a metacresol resin because though the resin has a softening point of around 100° C. (92 to 107° C.) and is in a state of solid at room temperature, it is in a state of liquid at kneading and easy to disperse, and further, the reaction starting temperature with HMT used in the present invention is as preferable as around 130° C., which is lower than the vulcanization temperature (145 to 190° C.) of tires, the metacresol resin being represented by the following formula (1):

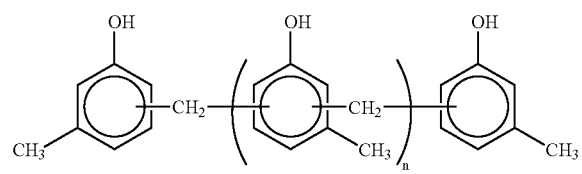

wherein n is preferably not less than 1, more preferably not less than 2. Further, n is preferably not more than 5.

Examples of such cresol resins are, for instance, Sumikanol 610 available from Sumitomo Chemical Co., Ltd., and the like.

The resorcin condensate is represented by the following formula (2):

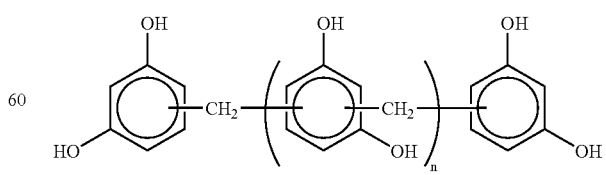

The modified resorcin condensate is a condensate having resorcin at its ends and its repeating units have resorcin or alkyl phenol as represented by the following formula (3):

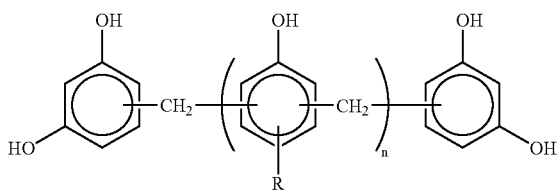

In the formulae (2) and (3), n is an integer. To secure adequate dispersion in the rubber, n is preferably an integer of 2 to 5.

R in the formula (3) is an alkyl group and the number of its carbon atoms is preferably not more than 9, more preferably not more than 8. More specifically, examples of the alkyl group R in the formula (3) are a methyl group, an ethyl group, and an octyl group. Also, the modified resorcin condensate explained above may have repeating units of a mixture of resorcin and alkyl phenol.

Examples of the modified resorcin condensate are, for instance, a resorcin.alkylphenol.formalin copolymer (Sumikanol 620 available from Sumitomo Chemical Co. Ltd. or the like) and a resorcin.formalin reactant, PENACOLITE resin (1319S available from Indspec Chemical Corporation or the like).

A content of the compound (C) is not less than 0.6 part by weight, preferably not less than 1 part by weight, more preferably not less than 3 parts by weight based on 100 parts by weight of the rubber component (A). In the case where the content of the compound (C) is less than 0.6 part by weight, adequate hardness may not be obtained. At the same time, the content of the compound (C) is not more than 10 parts by weight, preferably not more than 8 parts by weight, based on 100 parts by weight of the rubber component (A). In the case where the content of the compound (C) exceeds 10 parts by weight, hardness becomes excessively large, resulting in deterioration of crack growth resistance and elongation at break.

Carbon black and/or silica (D) is not particularly limited, and such grades of carbon black as SAF, ISAF, HAF, and FEF and silica conventionally used in the tire manufacturing industry may be used.

A content of the carbon black and/or silica (D) is not less than 10 parts by weight, preferably not less than 25 parts by weight based on 100 parts by weight of the rubber component (A). In the case where the content of the carbon black and/or silica (D) is less than 10 parts by weight, there is a tendency that hardness and tensile strength at break are inadequate. At the same time, the content of the carbon black and/or silica (D) is not more than 55 parts by weight, more preferably not more than 50 parts by weight. In the case where the content of the carbon black and/or silica (D) exceeds 55 parts by weight, there is a tendency that heat generation increases.

When silica is used, it is preferable to use silane coupling agents together with silica.

The silane coupling agent is not particularly limited and any silane coupling agents that have been used together with silica for preparing rubber compositions in the tire manufacturing industry may be used. More specifically, examples of the silane coupling agents are sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-trimethoxysilylpropyl benzothiazole tetrasulfide, 3-triethoxysilylpropyl methacrylate monosulfide, and 3-trimethoxysilylpropyl methacrylate monosulfide, mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane, vinyl silane coupling agents such as vinyltriethoxysilane and vinyltrimethoxysilane, amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane, glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane, nitro silane coupling agents such as 3-nitropropyltrimethoxysilane and 3-nitropropyltriethoxysilane, and chloro silane coupling agents such as 3-chloropropyltrimethoxysilane, 3-chloropropyltriethoxysilane, 2-chloroethyltrimethoxysilane, and 2-chloroethyltriethoxysilane. These silane coupling agents may be used alone or at least 2 kinds thereof may be used in combination. Among these, bis-(3-triethoxysilylpropyl)tetrasulfide and bis(3-triethoxysilylpropyl)disulfide are suitably used.

When the silane coupling agent is used, from the viewpoint of excellent processability and low heat build-up property of the rubber composition, the content of silane coupling agent is preferably not less than 6 parts by weight, more preferably not less than 8 parts by weight based on 100 parts by weight of silica. Further, when an excessive amount of silane coupling agent is compounded, the excessive silane coupling agent releases sulfur to crosslink the rubber excessively, which in turn results in reduction of tensile strength at break and increased cost. Therefore, the content of silane coupling agents is preferably not more than 12 parts by weight, more preferably not more than 10 parts by weight based on 100 parts by weight of silica.

If crosslinking is started during processing into sheets or topping, viscosity of the rubber increases and its processability deteriorates. To avoid such a situation, the rubber composition of the present invention is preferably to comprise HMT (E) that makes no decomposition under the processing temperature (90 to 140° C.).

A content of HMT (E) is preferably not less than 0.1 part by weight, more preferably not less than 0.5 part by weight based on 100 parts by weight of the rubber component (A). In the case where the content of HMT (E) is less than 0.1 part by weight, there is a tendency that crosslinking of the compound (C) is inadequate and a necessary hardness of the rubber composition cannot be obtained. Also, the content of HMT (E) is preferably not more than 3 parts by weight, more preferably not more than 2.5 parts by weight, based on 100 parts by weight of the rubber component (A). In the case where the content of HMT (E) exceeds 3 parts by weight, ammonia generated in thermal decomposition of HMT destroys adhesive layers between the fiber cords and the rubber, resulting in deterioration of adhesiveness of the rubber.

In the present invention, the rubber composition may comprise (F) a partial condensate of hexamethylolmelaminepentamethyl ether (HMMPME) or a partial condensate of hexamethoxymethylolmelamine (HMMM) (referred to as compound (F) hereinafter) because ammonia generated by decomposition of HMT into formalin and ammonia is made harmless and adhesiveness to cords can be improved.

The partial condensate of HMMPME is represented by the following formula (4):

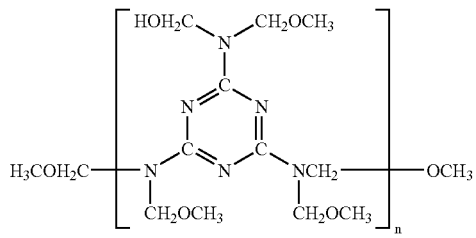

wherein n is an integer and generally 1, 2, or 3.

The partial condensate, of HMMM is represented by the following formula (5):

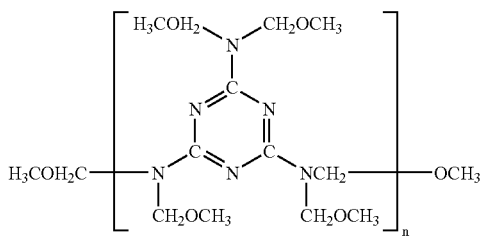

wherein n is an integer and generally 1, 2, or 3.

A content of the compound (F) is preferably not less than 0.5 part by weight, more preferably not less than 0.7 part by weight, based on 100 parts by weight of the rubber component (A). In the case where the content of the compound (F) is less than 0.5 part by weight, there is a tendency that an adequate hardness of the rubber composition cannot be obtained. At the same time, the content of the compound (F) is preferably not more than 3 parts by weight, more preferably not more than 2 parts by weight, based on 100 parts by weight of the rubber component (A). In the case where the content of the compound (F) exceeds 3 parts by weight, there is a tendency that viscosity of blended rubber is increased as a result of initiation of crosslinking during kneading or processing into sheets.

The rubber composition of the present invention may comprise reinforcing fillers other than carbon black and silica such as calcium carbonate, aluminum hydroxide, clay, talc, and alumina. These reinforcing fillers may be used alone or at least two kinds thereof may be used in combination.

A content of the reinforcing fillers other than carbon black and silica is preferably not less than 5 parts by weight, more preferably not less than 7 parts by weight based on 100 parts by weight of the rubber component (A). In the case where the content of the reinforcing fillers is less than 5 parts by weight, there is a tendency that tensile strength at break is not improved. Further, the content of the reinforcing fillers other than carbon black and silica is preferably not more than 50 parts by weight, more preferably not more than 40 parts by weight, based on 100 parts by weight of the rubber component (A). In the case where the content of the reinforcing fillers exceeds 50 parts by weight, the rubber composition tends to have excessively large hardness, resulting in decrease in elongation at break.

Besides the rubber component (A), sulfur (B), the compound (C), carbon black and/or silica (D), HMT (E), the compound (F), and the reinforcing fillers, the rubber composition of the present invention may suitably comprise compounding ingredients commonly utilized in the rubber industry, for example, aromatic oil, various antioxidants, zinc oxide, stearic acid, and various vulcanization accelerators.

The rubber composition of the present invention may be used to form such various kinds of members as carcasses, belts, bead apexes, clinch apexes, and bands. Though application thereof is not particularly limited to them, from the viewpoint of sufficient hardness and excellent reinforcing property and crack growth resistance, it is preferable to use the composition for carcasses and belts. In the case where the rubber composition of the present invention is used for carcasses or belts, after formation of a carcass or belt using fiber cords coated with the rubber composition, other tire members are laminated to produce an unvulcanized tire, and finally the unvulcanized tire is vulcanized to form a tire.

The fiber cords represent fiber cords that are coated with the rubber composition of the present invention when the rubber composition of the present invention is used for carcasses or belts. More specifically, the fiber cords are those obtained from such raw materials as polyester, nylon, rayon, polyethylene terephthalate, and aramid. From the viewpoint of superior thermal stability and low costs, polyester and aramid are preferable as raw materials for the fiber cords.

EXAMPLES

Now the present invention will be explained in detail based on Examples, but it should be understood that the present invention is not limited thereto.

Various chemicals used in Examples and Comparative Examples will be collectively explained below.

Natural rubber (NR): RSS#3

Butadiene rubber (BR): BR150B available from Ube Industries, Ltd.

Modified butadiene rubber (modified BR): Nipol BR1250H available from ZEON Corporation (initiator: lithium, content of tin atoms: 250 ppm, Mw/Mn: 1.5, an amount of bonded vinyls: 10 to 13% by weight)

Styrene-butadiene rubber (SBR): Nipol 1502 available from ZEON Corporation

Modified styrene-butadiene rubber (modified SBR): HPR340 available from JSR Corporation (modified S-SBR, an amount of bonded styrenes: 10% by weight, introduced to the ends by coupling with alkoxylsilane)

Insoluble sulfur: Crystex HSOT20 available from Flexsys Kabushiki Kaisha (insoluble sulfur comprising 80% by weight of sulfur and 20% by weight of oil)

Metacresol resin: Sumikanol 610 available from Sumitomo Chemical Co., Ltd. (n in the formula (1) is 16 to 17)

Modified resorcin resin: Sumikanol 620 available from Sumitomo Chemical Co., Ltd. (resorcin.alkyl phenol condensate) represented by the following formula (6):

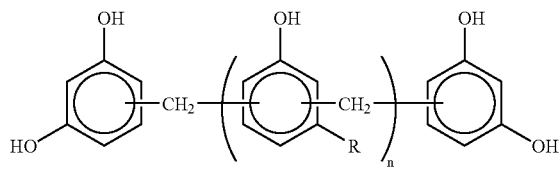

wherein R represents a methyl group, an octyl group, or a hydroxyl group, and these groups may co-exist.

Carbon black 1: SHOWBLACK N326 available from Cabot Japan Kabushiki Kaisha

Carbon black 2: SHOWBLACK N330 available from Cabot Japan Kabushiki Kaisha

Hexamethylenetetramine (HMT): NOCCELER H available from Ouchishinko Chemical Industrial Co., Ltd.

Partial condensate of hexamethylolmelaminepentamethyl ether (HMMPME): effective resin portion of Sumikanol 507A available from Sumitomo Chemical Co., Ltd. (a mixture of about 65% of a substance having methylene groups, silica, and oil) represented by the following formula (4):

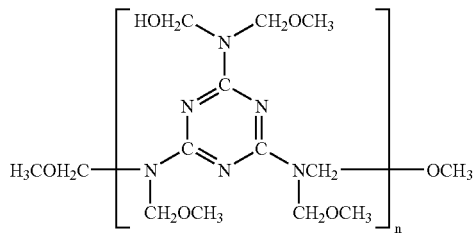

wherein n is an integer of 1, 2, or 3.

Silica: 115Gr available from Rhodia Japan, Ltd.

Aromatic oil: Process X-140 available from Japan Energy Corporation

Antioxidant: NOCRAC 224 (2,2,4-trimethyl-1,2-dihydroquinoline polymer) available from Ouchishinko Chemical Industrial Co., Ltd.

Zinc oxide: Ginrei R available from Toho Zinc Co., Ltd.

Stearic acid: Tsubaki available from NOF Corporation

Vulcanization accelerator: NOCCELER NS (N-tert-butyl-2-benzothiazolylsulfenamido) available from Ouchishinko Chemical Industrial Co., Ltd.

N-cyclohexylthiophthalimide (CTP): Retarder CTP available from Ouchishinko Chemical Industrial Co., Ltd.

Examples 1 to 14 and Comparative Examples 1 to 11

In accordance with the compounding prescriptions shown in Tables 1 and 2, compounding chemicals other than insoluble sulfur and the vulcanization accelerator were kneaded in a Banbury mixer (HMT, the partial condensate of HMMPME, and CTP were also excluded from this kneading process). Then, insoluble sulfur and the vulcanization accelerator (together with HMT, the partial condensate of HMMPME, and CTP if included in the compounding prescription) were added and the obtained mixture was compounded with an open roll to prepare unvulcanized rubber compositions. The unvulcanized rubber compositions were press-vulcanized under 170° C. for 12 minutes, and vulcanized rubber compositions of Examples 1 to 14 and Comparative Examples 1 to 11 were obtained.

(Mooney Viscosity)

A test piece with a predetermined size was prepared from each of the unvulcanized rubber compositions and according to JIS K 6300 "Physical testing methods for unvulcanized rubber", Mooney viscosity ($ML_{1+4}$) of the respective unvulcanized rubber compositions was measured using a Mooney viscometer manufactured by Shimadzu Corporation, after a lapse of four minutes after rotating a small rotor under the condition of a temperature of 130° C. elevated by pre-heating for 1 minute. The smaller the Mooney viscosity is, the better the processability is.

(Viscoelasticity Test)

Using a viscoelasticity spectrometer manufactured by Iwamoto Corporation, complex modulus (E*) and loss tangent (tan δ) of the respective vulcanized rubber compositions under the conditions of an initial strain of 10%, a dynamic strain of 2%, and a frequency of 10 Hz were measured under 70° C. The larger the complex modulus (E*) is, the larger the rigidity is and the superior the steering stability is. The smaller the loss tangent (tan δ) is, the better the low heat build-up property is.

(Tensile Test)

According to JIS K 6251 "Rubber, vulcanized or thermoplastic—Determination of tensile stress-strain properties", No. 3 dumbbell type test pieces were prepared from the aforementioned vulcanized rubber compositions and a tensile test was carried out to measure elongation at break EB (%) for the respective test pieces. In addition, the test pieces prepared from the vulcanized rubber compositions of Examples 1 to 6 and Comparative Examples 1 to 6 were subjected to deterioration by thermal oxidation using a thermal oven at a temperature of 100° C. for 48 hours, and then elongation at break EB (%) was measured for the respective test pieces. The higher the EB is, the better the EB is.

(Adhesion Test)

Fiber cords (polyester (made from terephthalic acid and ethylene glycol) available from Teijin Ltd.) were dipped in a mixture of resorcin and formaldehyde to form resorcin resin films on the fiber cords (dipping process). Then, the fiber cords thus prepared were coated with unvulcanized rubber compositions and formed into unvulcanized carcasses. The unvulcanized carcasses were heated at 170° C. for 12 minutes to form vulcanized carcasses.

The carcasses thus prepared were used for adhesion test, and strength for peeling the fiber cords off the vulcanized carcasses was measured for the respective test pieces using a tensile tester (manufactured by Instron Japan Co., Ltd.). Then adhesion index of the rubber composition of Comparative Example 1 was referred to as 100, and peeling strength of each of the other rubber compositions was represented by an index calculated from the equation below:

(Adhesion index)=(Peeling strength of respective rubber compositions)/(Peeling strength of the rubber composition of Comparative Example 1)×100

(Rolling Workability)

During a kneading process with an open roll, winding of the respective unvulcanized rubber compositions on the roll was evaluated by a visual observation. Rolling workability index of the rubber composition of Comparative Example 7 was referred to as 100 and rolling workability index of each of other rubber compositions was represented by an index. The larger the rolling workability index is, the more smoothly the kneading proceeds and thus processability is superior.

(Hardness of Rubber)

According to JIS K 6253 "Hardness Test Method of Vulcanized Rubbers and Thermoplastic Rubbers", hardness of the respective vulcanized rubber compositions was measured with a type A durometer.

(Heavy Load Durability Drum Test)

Fiber cords (polyester (made from terephthalic acid and ethylene glycol) available from Teijin Ltd.) were coated with the respective unvulcanized rubber compositions and formed into unvulcanized carcasses. The respective carcasses were laminated with other tire members to prepare unvulcanized tires. The unvulcanized tires were vulcanized under the condition of 170° C. for 12 minutes to produce commercial truck tires (tire size of 225/70R16 117/115).

Each of the truck tires was run on a drum at a speed of 20 km/h by applying, to the tire, a load of 230% of a maximum load (maximum inner pressure) as defined in JIS and a running distance until swelling at a bead part or a tread part was generated was measured. Heavy load durability index of the rubber composition of Comparative Example 7 was referred to as 100, and each of the running distances of the other rubber compositions was represented by an index calculated from the equation shown below. The larger the heavy load durability index is, the superior the durability of the bead part or the tread part is.

(Heavy load durability index)=(Running distances of tires using respective rubber compositions)/(Running distance of tire using the rubber composition of Comparative Example 7)×100

Evaluation results are shown in Tables 1 and 2.

TABLE 1

| | 1 | 2 | 3 | 4 | 5 | 6 |
|---|---|---|---|---|---|---|
| | Example | | | | | |
| Amounts (parts by weight) | | | | | | |
| NR | 60 | 60 | 60 | 60 | 60 | 60 |
| BR | 20 | 20 | 20 | 20 | — | 20 |
| Modified BR | — | — | — | — | 20 | 20 |
| SBR | 20 | 20 | 20 | 20 | 20 | — |
| Metacresol resin | 3.5 | 5 | 3.5 | 3.5 | 3.5 | 3.5 |
| Insoluble sulfur (sulfur amount) | 2.5 | 2.5 | 2.9 | 2.5 | 2.5 | 2.5 |
| HMT | 1.0 | 1.4 | 1.0 | 1.0 | 1.0 | 1.0 |
| Partial condensate of HMMPME | — | — | — | 0.5 | — | — |
| Silica | — | — | — | — | — | 10 |
| Carbon black 1 | 50 | 50 | 50 | 50 | 50 | 45 |
| Aromatic oil | 5 | 5 | 5 | 5 | 5 | 5 |
| Antioxidant | 2 | 2 | 2 | 2 | 2 | 2 |
| Zinc oxide | 5 | 5 | 5 | 5 | 5 | 5 |
| Stearic acid | 3 | 3 | 3 | 3 | 3 | 3 |
| Vulcanization accelerator | 1 | 1 | 1 | 1 | 1 | 1 |
| CTP | 0.2 | 0.2 | 0.2 | 0.2 | 0.2 | 0.2 |
| Evaluation results | | | | | | |
| Mooney viscosity | 55 | 56 | 55 | 55 | 56 | 56 |
| E* (MPa) | 9.0 | 11.5 | 10.4 | 9.2 | 8.8 | 8.4 |
| tan δ | 0.132 | 0.138 | 0.131 | 0.134 | 0.110 | 0.105 |
| EB (%) before aging | 320 | 290 | 280 | 315 | 305 | 330 |
| EB (%) after aging | 200 | 180 | 170 | 190 | 190 | 220 |
| Adhesion index | 100 | 80 | 110 | 120 | 100 | 110 |
| | Comparative Example | | | | | |
| Amounts (parts by weight) | | | | | | |
| NR | 60 | 60 | 60 | 60 | 60 | 60 |
| BR | — | 40 | 20 | 20 | 20 | 20 |
| Modified BR | — | — | — | — | — | — |
| SBR | 40 | — | 20 | 20 | 20 | 20 |
| Metacresol resin | 3.5 | 3.5 | — | 0.5 | 3.5 | 35 |
| Insoluble sulfur (sulfur amount) | 2.5 | 2.5 | 2.5 | 2.5 | 3.5 | 1.9 |
| HMT | 1.0 | 1.0 | — | 0.14 | 1.0 | 1.0 |
| Partial condensate of HMMPME | — | — | — | — | — | — |
| Silica | — | — | — | — | — | — |
| Carbon black 1 | 50 | 50 | 50 | 50 | 50 | 50 |
| Aromatic oil | 5 | 5 | 5 | 5 | 5 | 5 |
| Antioxidant | 2 | 2 | 2 | 2 | 2 | 2 |
| Zinc oxide | 5 | 5 | 5 | 5 | 5 | 5 |
| Stearic acid | 3 | 3 | 3 | 3 | 3 | 3 |
| Vulcanization accelerator | 1 | 1 | 1 | 1 | 1 | 1 |
| CTP | 0.2 | 0.2 | 0.2 | 0.2 | 0.2 | 0.2 |
| Evaluation results | | | | | | |
| Mooney viscosity | 51 | 55 | 53 | 53 | 55 | 54 |
| E* (MPa) | 9.0 | 8.4 | 5.3 | 5.7 | 12.4 | 6.8 |
| tan δ | 0.155 | 0.130 | 0.140 | 0.147 | 0.155 | 0.160 |

TABLE 1-continued

|  | 1 | 2 | 3 | 4 | 5 | 6 |
|---|---|---|---|---|---|---|
| EB (%) before aging | 320 | 250 | 380 | 360 | 220 | 420 |
| EB (%) after aging | 200 | 120 | 270 | 250 | 80 | 300 |
| Adhesion index | 100 | 90 | 100 | 100 | 100 | 30 |

TABLE 2

|  | Example | | | | | | | |
|---|---|---|---|---|---|---|---|---|
|  | 7 | 8 | 9 | 10 | 11 | 12 | 13 | 14 |
| Amounts (parts by weight) | | | | | | | | |
| NR | 60 | 60 | 60 | 60 | 60 | 40 | 60 | 60 |
| Modified BR | 15 | 15 | — | 15 | 15 | 30 | 15 | 15 |
| Modified SBR | 25 | 25 | 25 | 25 | 25 | 30 | 25 | 25 |
| BR | — | — | 15 | — | — | — | — | — |
| SBR | — | — | — | — | — | — | — | — |
| Carbon black 2 | 23 | 10 | 23 | 36 | 28 | 23 | 46 | 23 |
| Silica | 23 | 36 | 23 | 10 | 27 | 23 | — | 23 |
| Modified resorcin resin | 1.0 | 1.0 | 1.0 | 1.0 | 1.0 | 1.0 | 1.0 | 1.0 |
| HMT | — | — | — | — | — | — | 0.5 | 0.5 |
| Partial condensate of HMMPME | 1.5 | 1.5 | 1.5 | 1.5 | 1.5 | 1.5 | — | — |
| Aromatic oil | 9 | 9 | 9 | 9 | 9 | 9 | 9 | 9 |
| Stearic acid | 2 | 2 | 2 | 2 | 2 | 2 | 2 | 2 |
| Zinc oxide | 5 | 5 | 5 | 5 | 5 | 5 | 5 | 5 |
| Antioxidant | 1.0 | 1.0 | 1.0 | 1.0 | 1.0 | 1.0 | 1.0 | 1.0 |
| Insoluble sulfur (sulfur amount) | 2.5 | 2.5 | 2.5 | 2.5 | 2.5 | 2.5 | 2.5 | 2.5 |
| Vunlcanization accelerator | 1.0 | 1.0 | 1.0 | 1.0 | 1.0 | 1.0 | 1.0 | 1.0 |
| Evaluation results | | | | | | | | |
| Rolling workability index | 110 | 90 | 110 | 110 | 110 | 80 | 120 | 120 |
| Rubber hardness | 58 | 56 | 59 | 60 | 65 | 57 | 58 | 59 |
| tan δ | 0.075 | 0.070 | 0.092 | 0.080 | 0.105 | 0.070 | 0.084 | 0.089 |
| Elongation at break EB (%) | 550 | 590 | 570 | 570 | 480 | 490 | 540 | 560 |
| Heavy load durability index | 210 | 200 | 180 | 175 | 90 | 140 | 160 | 160 |

|  | Comparative Example | | | | |
|---|---|---|---|---|---|
|  | 7 | 8 | 9 | 10 | 11 |
| Amounts (parts by weight) | | | | | |
| NR | 60 | 60 | 60 | 60 | 60 |
| Modified BR | — | 40 | 15 | 40 | — |
| Modified SBR | 40 | — | 25 | — | 40 |
| BR | — | — | — | — | — |
| SBR | — | — | — | — | — |
| Carbon black 2 | 46 | 46 | — | — | — |
| Silica | — | — | 46 | 46 | 46 |
| Modified resorcin resin | 1.0 | 1.0 | 1.0 | 1.0 | 1.0 |
| HMT | — | — | — | — | — |
| Partial condensate of HMMPME | 1.5 | 1.5 | 1.5 | 1.5 | 1.5 |
| Aromatic oil | 9 | 9 | 9 | 9 | 9 |
| Stearic acid | 2 | 2 | 2 | 2 | 2 |
| Zinc oxide | 5 | 5 | 5 | 5 | 5 |
| Antioxidant | 1.0 | 1.0 | 1.0 | 1.0 | 1.0 |
| Insoluble sulfur (sulfur amount) | 2.5 | 2.5 | 2.5 | 2.5 | 2.5 |
| Vunlcanization accelerator | 1.0 | 1.0 | 1.0 | 1.0 | 1.0 |
| Evaluation results | | | | | |
| Rolling workability index | 100 | 70 | 80 | 70 | 70 |
| Rubber hardness | 59 | 58 | 55 | 53 | 54 |
| tan δ | 0.102 | 0.093 | 0.112 | 0.107 | 0.105 |
| Elongation at break EB (%) | 550 | 470 | 600 | 590 | 590 |
| Heavy load durability index | 100 | 80 | 80 | 60 | 60 |

What is claimed is:

1. A tire having a carcass or a belt formed by a rubber composition, comprising:

2 to 2.9 parts by weight of (B) sulfur:

0.6 to 10 parts by weight of (C) a cresol resin;

10 to 55 parts by weight of (D) a carbon black and/or silica; and 0.1 to 3 parts by weight of (E) hexamethylenetetramine, based on 100 parts by weight of (A) a rubber component comprising a natural rubber and/or isoprene rubber and at least two kinds of synthetic rubbers selected from the group consisting of a butadiene rubber, modified butadiene rubber, styrene-butadiene rubber, and modified styrene-butadiene rubber, wherein the rubber composition is coated on fiber cords, the coated fiber cords being used to form the carcass or the belt.

2. A tire having a carcass or a belt formed by a rubber composition, comprising:

2 to 2.9 parts by weight of (B) sulfur;

0.6 to 10 parts by weight of (C) at least one compound selected from the group consisting of a cresol resin, a resorcin condensate, and a modified resorcin condensate; and 10 to 55 parts by weight of (D) a carbon black and/or silica, based on 100 parts by weight of (A) a rubber component comprising a natural rubber and/or isoprene rubber, a modified butadiene rubber and a modified styrene-butadiene rubber, wherein the rubber composition is coated on fiber cords, the coated fiber cords being used to form the carcass or the belt.

3. The tire having a carcass or the belt of claim 1, wherein the rubber composition further comprises 0.5 to 3 parts by weight of (F) a partial condensate of hexamethylolmelamine-pentamethyl ether or a partial condensate of hexamethoxymethylolmelamine, based on 100 parts by weight of (A) the rubber component.

4. The tire having a carcass or the belt of claim 1, wherein the rubber component (A) comprises a modified butadiene rubber or a modified styrene-butadiene rubber as the synthetic rubber.

5. The tire having a carcass or the belt of claim 1, wherein the rubber component (A) comprises a modified butadiene rubber and a modified styrene-butadiene rubber as the synthetic rubber.

6. The tire having a carcass or the belt of claim 1, wherein the rubber component (A) comprises 40 to 80% by weight of a natural rubber and/or isoprene rubber and 10 to 30% by weight of a modified butadiene rubber.

7. The tire having a carcass or the belt of claim 2, wherein the rubber component (A) comprises 40 to 80% by weight of a natural rubber and/or isoprene rubber, 10 to 30% by weight of a modified butadiene rubber and 10 to 40% by weight of a modified styrene-butadiene rubber.

8. The tire having a carcass or the belt of claim 2, wherein the rubber composition further comprises 0.1 to 3 parts by weight of (E) hexamethylenetetramine, based on 100 parts by weight of (A) the rubber component.

9. The tire having a carcass or the belt of claim 2, wherein the rubber composition further comprises 0.5 to 3 parts by weight of (F) a partial condensate of hexamethylolmelamine-pentamethyl ether or a partial condensate of hexamethylenetetramine, based on 100 parts by weight of (A) the rubber component.

10. The tire having a carcass or the belt of claim 1, wherein the modified butadiene rubber is modified to contain tin, and the modified styrene-butadiene rubber is modified to contain tin or silica.

11. The tire having a carcass or the belt of claim 2, wherein the modified butadiene rubber is modified to contain tin, and the modified styrene-butadiene rubber is modified to contain tin or silica.

* * * * *